Sept. 30, 1969     H. NAGIN     3,469,300
METHOD FOR FRICTION WELDING METAL BARS
Filed Sept. 30, 1966
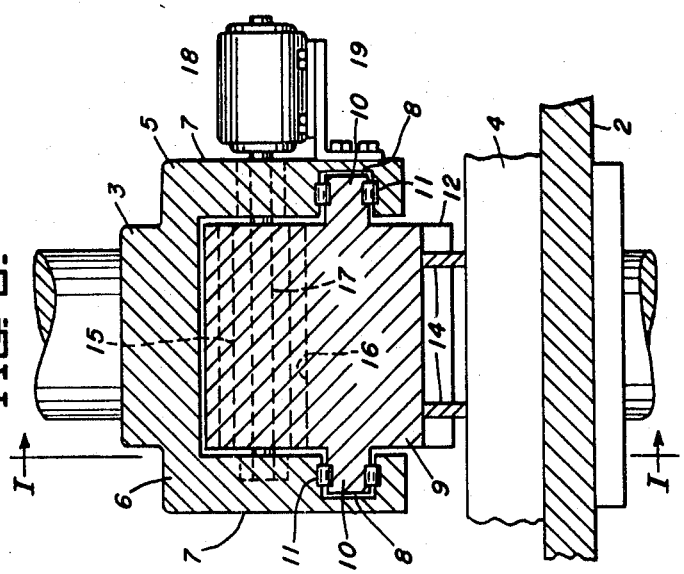
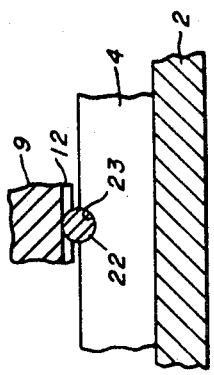
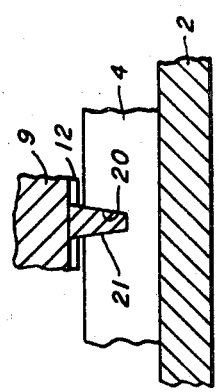
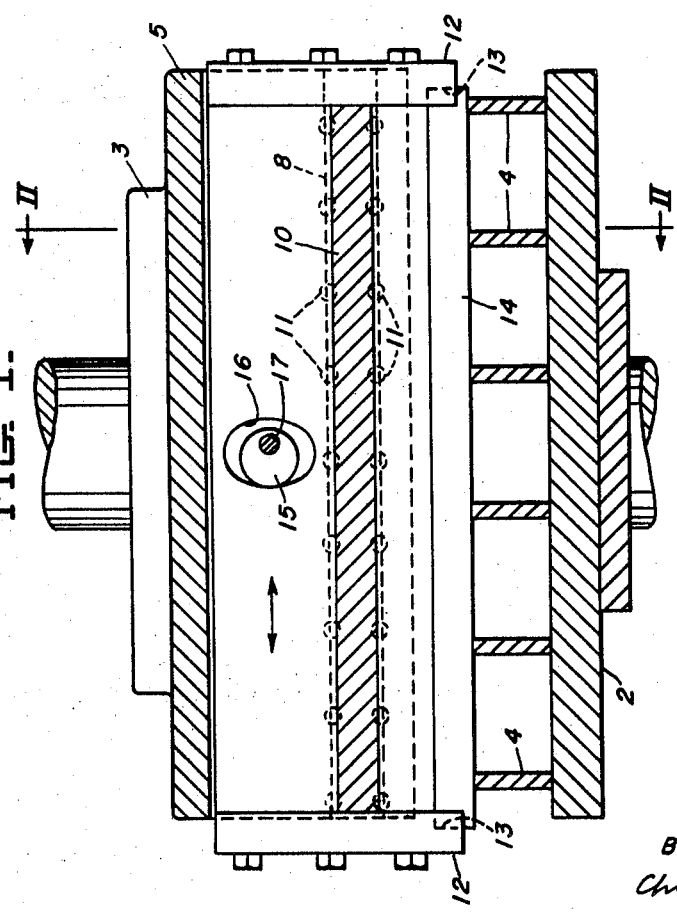
INVENTOR.
HAROLD NAGIN
By
Christy, Parmelee & Strickland
Attorneys United States Patent Office 3,469,300
Patented Sept. 30, 1969

3,469,300
METHOD FOR FRICTION WELDING METAL BARS
Harold Nagin, Pittsburgh, Pa., assignor to Reliance Steel Products Company, McKeesport, Pa., a corporation of Pennsylvania
Filed Sept. 30, 1966, Ser. No. 583,270
Int. Cl. B23k 29/00, 31/02
U.S. Cl. 29—470.3                                    3 Claims

ABSTRACT OF THE DISCLOSURE

This invention relates to a method of making a metal grating in which a transversely-extending cross bar intersects and makes contact with a plurality of longitudinally-extending bearing bars. The cross bar is friction welded to the bearing bars at the intersections therewith by means of reciprocating the cross bar rapidly while applying pressure uniformly thereto and thereby effecting surface melting only at the contacting surfaces of the bars, continuing the reciprocating motion until the cross bar has been pressed to the desired depth in all of the bearing bars, and then stopping the reciprocating motion while continuing the pressure until the molten metal has set.

---

This invention relates to metal products formed of intersecting metal pieces, such as gratings, ladders, scaffolds, railings and the like and the method of and apparatus for forming them.

The invention is especially applicable to the manufacture of metal grating wherein spaced cross bars are welded to a plurality of longitudinally-extending bearer bars, and will hereinafter be particularly illustrated and described in that connection, but this is by way of illustration, and the application of the invention to other metal structures formed by intersecting longitudinal and transverse pieces will be readily apparent to those skilled in the art.

At the present time gratings, such as sidewalk gratings and bridge floors, are commonly formed of steel bars and cross bars. The bearer bars are intermittently moved in parallel spaced relation under a welding press. The cross bars, cut to the proper length, are placed over the bearer bars and the press is closed while electric current is applied to the bearer bars and the cross bars. Heat is generated at the points of intersection and the bars are pressure-welded by the action of heat and the pressure of the press. Two or three cross bars may be welded at a time, after which the press is opened and the bearer bars again advanced and the cycle is repeated.

Aluminum gratings generally have the cross bars mechanically interlocked with the bearer bars instead of being pressure-welded because of the short temperature range between which aluminum is soft enough to pressure weld and the melting temperature of aluminum, and the difficulty of uniformly heating the metal at each point of intersection of the cross bars and bearer bars.

According to the present invention the cross bars are reciprocated through a short stroke at high speed while moderate pressure is applied, whereby welding heat is quickly generated by friction between the bearer bars and the moving cross bars, and when a proper degree of heat is reached the reciprocating motion is stopped and increased pressure is applied to effect the weld. The most effective procedure is to first notch the bearer bars to a depth almost equal to the depth of the cross bars and to place the cross bars in the notches and then reciprocate them. Only the metal at the contacting surfaces, barely more than a film of metal, is brought to welding temperature before the translatory motion is stopped and the increased pressure then applied.

Under these conditions welding of the contacting surfaces is effected before the heat has penetrated to a substantial extent into the entire mass of metal, thereby conserving energy and resulting in an improved product since the structure of the metal is not so drastically disturbed. It also becomes possible to economically produce welded aluminum gratings and to weld dissimilar metals, such as aluminum and steel. The apparatus itself need be relatively simple and inexpensive.

My invention may be more fully understood by reference to the accompanying drawings in which:

FIG. 1 is a vertical section through one form of apparatus for practicing the method, the section being in the general plane of line I—I of FIG. 2;

FIG. 2 is a transverse vertical section in the plane of line II—II of FIG. 1;

FIG. 3 is a fragmentary view showing a modification in which the bearer bars are notched to initially receive the cross bars, and the cross bars are of upwardly-increasing section; and FIG. 4 is a view generally similar to FIG. 3, but showing the cross bar as a round section.

In the drawings, 2 designates the bed or lower platen of a press and 3 designates the upper platen. One of the members 2 and 3 is movable vertically relative to the other. The press is preferably a hydraulic press, but may be a mechanical press.

The longitudinally-extending members, hereinafter designated generally as bearer bars, are indicated at 4. They are placed in parallel spaced upright position on the lower platen as indicated.

The upper platen 3 carries a frame 5 having a top portion 6 and parallel depending spaced parallel sides 7. Each of the sides 7 is provided with a longitudinally-extending channel 8, the general form of the member 5 being an inverted U shape.

Received in the space between the side walls 7 is a reciprocable body or bar holder 9 which has a laterally-extending rib 10 at each side thereof. The ribs 10 extend into the channels 8 and roller bearings 11 are provided between the ribs 10 and the tops and bottoms of the channels to provide an anti-friction mounting in the frame for the bar holder. At each end of the member 9 there is a removable end plate 12, and these end plates may have one or more vertical grooves 13 formed therein to receive the ends of cross bars 14 and hold them perpendicular to the bearer bars 4.

Means is provided for reciprocating the member 9 at a relatively high rate of speed. Various mechanisms may be used for accomplishing this purpose, and I have illustrated an eccentric 15 passing through a vertically-elongated opening 16 in the member 9, this eccentric being keyed on a shaft 17 driven by a motor 18 supported on a bracket 19 at one side of the frame member 5. The arrangement of the eccentric 15 and the opening 16 is such that the cam will impart a rectilinear movement to the member 9 and it is thereby moved only in a horizontal plane. Typically the member 9 may be reciprocated through a limited stroke at a rate of 2400 cycles per minute or faster.

In the operation of the apparatus the cross members 14 which are cut to length are engaged in the end plates 12 of the frame 9. One or more of these cross members may be applied at one time, and I have illustrated in the drawings two such cross members to be simultaneously reciprocated. When the parts are in the position shown, a light pressure is applied as the bars 14 are reciprocated at high speed across the bearer bars 4. The length of travel of the reciprocating member 9 need be only a fraction of an inch, even less than ½ inch, but as the reciprocation takes place with the parts under pressure, heat is generated by the cross bars rubbing on the top edges of the bearer bars. In no case is it necesary for the bar holder to move a distance much greater than the thickness of the cross bar, so that the generation of frictional heat will be confined to the immediate area of contact between the intersecting pieces where the weld is to be made. As this rubbing operation continues, the metal reaches a welding temperature, and when the proper condition is reached, the reciprocation or translatory movement of the bars is stopped while the pressure is still applied and preferably increased to the intersecting cross bars and bearer bars to effect a weld. After the weld has been completed the press is opened, the bearer bars 4 are advanced, and two other cross bars are put in place and the cycle is repeated.

While the operation above described may be followed, it is preferable to follow the procedure illustrated in FIG. 3. In this figure the cross bars 4 are notched at 20 to a depth only slightly less than the depth of the cross bars, and with a slight upward divergence so that the notch is wider at the top than at the bottom. The cross bars 21 are of a corresponding wedge section.

With the arrangement shown in FIG. 3, when the cross bars are reciprocated under pressure, heat will be generated not only on the contacting edges of the intersecting pieces, but also between the sides of the notches 20 and the sloping faces of the cross bars 21. A film of metal on the contacting surfaces may be quickly brought to a fluid condition. Indications are that welding conditions will be reached in about a second, and when this condition is reached, the reciprocation of the cross bars is stopped and pressure is applied as described above to press the tops of the cross bars flush with the tops of the bearer bars and complete the weld. Because heat is generated on the side faces of the notches 20, as well as on the bottom edge of each notch, this arrangement provides a more secure weld with less expenditure of energy than would be required with the arrangement shown in FIGS. 1 and 2 particularly if the cross bars are forced down flush with the tops of the bearer bars.

In the modification shown in FIG. 4 the arrangement is generally the same as shown in FIG. 3, but in this case the cross bars are round sections as indicated at 22 and the bearer bars 4 have circularly-curved notches 23 formed therein to conform to the curvature of the cross bars 22. With this arrangement as in FIG. 3 the heating will take place on the sides of the notches as well as directly under the cross bar to effect a better weld.

This method of welding as herein described effects a very substantial saving in energy requirements over the present method of pressure welding in that the contacting surfaces between the reciprocating cross bars and the fixed bearer bars will be very quickly brought to a welding temperature before much of the heat will have been dissipated into the surrounding metal masses, and also because only a relatively thin film of metal need be brought to the welding temperature.

Moreover in electric pressure welding much of the energy is dissipated by stray currents into parts of the grating that have already been finished, and the energy flow is not confined to passing through the contacting surfaces of the cross bars and bearer bars. The present indications are that the energy requirements will be reduced possibly as much as 80% and the apparatus is relatively simple since it requires only a standard press and the specially arranged cross head 5 with its associated parts for reciprocating the cross bars. Since the cross bars are reciprocated under pressure and the molten film of metal which forms acts somewhat as a lubricant, it follows that if some points are higher than others, the generation of heat will occur first at these points, and when these high points develop a fluid film the lower points will then, as the operation continues, become the greater friction heat generating surfaces so that irregularities which preclude the successful pressure welding electrically of aluminum by reason of the low temperature spread between its solid and liquid state does not prevent a successful weld from being made according to the present invention.

Also with this method different metals can be welded successfully because of the manner in which heat is generated at the intersecting surfaces of the cross bars and bearer bars. This has not been successfully accomplished in gratings or like structures with electric pressure welding.

I am aware that good butt welds have heretofore been accomplished by pressing the end of a rapidly-rotating piece against a stationary or oppositely-rotating piece to make an end-to-end joint, but in the present invention heat is generated by the rubbing movement of one member across another, and at two or more points simultaneously.

While I have shown one simple form of apparatus for practicing the invention and described one particular structure, it will be understood that this is by way of illustration and that various changes and modifications may be made within the contemplation of the invention and under the scope of the following claims.

I claim:

1. The method of making a grating or like construction in which a cross bar extends transversely of a plurality of longitudinally-extending bearing bars, both bars being of metal with the cross bar welded to the bearing bars which comprises:
    (a) positioning the longitudinal bars in fixed side-by-side spaced relation with the bars set edgewise and with their edges in a common plane,
    (b) placing a cross bar across the edges of all of the longitudinally-extending bars to simultaneously make contact with all of them,
    (c) reciprocating the cross bar rapidly while applying pressure uniformly thereto and thereby effecting surface melting only of the contacting surfaces of the cross bar and the fixed longitudinally-extending bars and continuing such reciprocating motion until the cross bar has been pressed to the desired depth in all of the longitudinally-extending bars, and
    (d) then stopping the reciprocation while continuing the pressure until any molten metal has set.

2. The method of making a grating or like construction as defined in claim 1 wherein the bars are formed of aluminum.

3. The method defined in claim 1 in which the bearing bars are initially provided with spaced notches to receive the cross bar wherein the notches have sides which diverge upwardly from the bottom of the notches to the top edge and the cross bar in section is of a maximum width power greater than the width of the notches whereby frictional melting heat is generated on the sides of the notches and the cross bar until the cross bar has contacted and effected surface melting at the bottoms of the notches after which the reciprocation is stopped while the pressure is continued until any melted metal has hardened.

References Cited
UNITED STATES PATENTS

| | | | |
|---|---|---|---|
| 1,636,592 | 7/1926 | Cushwa | 29—160 X |
| 3,058,513 | 10/1962 | Schaub et al. | 156—73 X |
| 3,209,448 | 10/1965 | Jones | 29—470.1 |
| 3,269,002 | 8/1966 | Hollander et al. | 29—470.3 |

FOREIGN PATENTS 572,789  10/1945  Great Britain.

OTHER REFERENCES

Russian publication entitled "Russion Journal Information on Inventive Matters #10," published October 1963, pp. 6–9.

JOHN F. CAMPBELL, Primary Examiner

D. C. REILEY, Assistant Examiner

U.S. Cl. X.R.

29—160, 471.1, 482; 156—73; 228—2